United States Patent [19]

Doster et al.

[11] Patent Number: 4,457,372

[45] Date of Patent: Jul. 3, 1984

[54] METHOD OF RECOVERING PETROLEUM FROM UNDERGROUND FORMATIONS

[75] Inventors: Martha S. Doster; Alton J. Nute, both of Houston, Tex.; Charles A. Christopher, Broken Arrow, Okla.

[73] Assignee: Texaco Inc., White Plains, N.Y.

[21] Appl. No.: 318,784

[22] Filed: Nov. 6, 1981

[51] Int. Cl.$^3$ .............................................. E21B 43/22
[52] U.S. Cl. ...................................... 166/274; 166/272; 252/8.55 D
[58] Field of Search ................ 252/8.55 D, 8.55 R; 166/246, 274, 275, 272

[56] References Cited

U.S. PATENT DOCUMENTS

| | | | |
|---|---|---|---|
| 2,761,837 | 9/1956 | Brown et al. | 252/8.55 |
| 3,305,016 | 2/1967 | Lindblom et al. | 252/8.55 X |
| 3,360,043 | 12/1967 | Braden et al. | 252/8.55 X |
| 3,372,749 | 3/1968 | Williams | 166/274 |
| 3,796,266 | 3/1974 | Carlin et al. | 166/274 X |
| 4,008,766 | 2/1977 | Savins | 252/8.55 X |
| 4,044,831 | 8/1977 | Allen | 252/8.55 X |
| 4,104,193 | 8/1978 | Carter et al. | 252/8.55 X |
| 4,297,226 | 10/1981 | Hunter | 252/8.55 |
| 4,347,146 | 8/1982 | Abdo | 252/8.55 |

Primary Examiner—Herbert B. Guynn
Attorney, Agent, or Firm—Jack H. Park; Walter D. Hunter; Richard A. Morgan

[57] ABSTRACT

A method is disclosed in which the production of petroleum is improved or reinstated in formations that have been partially depleted by primary recovery techniques or where the communication between the injection well and the production well has been restricted by the swelling of water sensitive clays in the formation. In this method an aqueous fluid comprising polysaccharide in sufficient concentration to increase the viscosity of the aqueous fluid, a water soluble quanidine compound and a naturally occurring salt is injected into the formation through an injection well and petroleum and aqueous fluids are produced through a production well.

4 Claims, No Drawings

METHOD OF RECOVERING PETROLEUM FROM UNDERGROUND FORMATIONS

BACKGROUND OF THE INVENTION

1. Field of the Invention

This invention pertains to a method for recovering petroleum from subterranean petroleum-containing formations. Particularly, this invention relates to a method of treating underground formations containing clays or clay like material to increase or reestablish water permeability of the clay. More particularly, this invention relates to an improved secondary recovery process wherein petroleum is displaced from a formation by flooding the formation with an aqueous solution containing a polysaccharide in sufficient quantity to increase the viscosity of the solution, a water soluble guanidine compound and a naturally occurring salt.

This invention is particularly useful in improving or reinstating the production of petroleum in formations that have been partially depleted by primary recovery techniques or where the communication between the injection well and the production well has been restricted by the swelling of water-sensitive clays in the formation.

2. Description of the Prior Art

The production of petroleum is usually accomplished by drilling into a petroleum containing formation and utilizing one of the well known methods for the recovery of petroleum. However it is recognized that these primary recovery techniques may recover only a minor portion of the petroleum present in the formation particularly when applied to formations containing viscous petroleum. In such cases, secondary recovery methods are called for. Among the methods employed in secondary recovery operations are water flooding, steam injection, gas flooding and combinations thereof. One of the most serious problems encountered in secondary recovery operations with water flooding or steam injection procedures is that the underground oil-containing formation also contains clay or clay like bodies associated therewith. Treatment of such a formation with water or steam generally results in swelling of the clay by absorption of the water, with the concomitant result that the water permeability of a formation is materially decreased. The decrease in the permeability of the formation to water causes a reduction in the amount of oil which can be recovered by secondary recovery operations.

It is known from the prior art; U.S. Pat. Nos. 3,360,043 and 3,444,931, that clay containing formations can be treated to improve the water and/or steam permeability of the clay by contact with a guanidine salt dissolved in various hydrocarbon solvents.

Another problem which reduces the total effectiveness of water flooding operations is poor sweep efficiency. Poor sweep efficiency is associated with the inability to contact all of the petroleum containing flow channels with the injected aqueous fluid. Poor sweep efficiency results primarily from an adverse mobility ratio. The injected aqueous fluid generally has a substantially lower viscosity at reservoir conditions than the viscosity of the formation crude which it is intended to displace. A low viscosity fluid will not displace a high viscosity fluid uniformly and there is tendency for the injected low viscosity fluid to channel into the high viscosity fluid and bypass a substantial portion of high viscosity fluid. The displacement efficiency is improved substantially if the injected fluid viscosity is increased to a value greater than the displaced fluid viscosity. This problem has also been recognized by persons skilled in the art of oil recovery, and various additives have been proposed to increase the viscosity of the injected fluid in order to improve the sweep efficiency. Hydrophilic polymers which have the effect of increasing the viscosity of the displacing fluid improve the mobility ratio and decrease the tendency for the injected fluid to channel into and inefficiently displace the higher viscosity petroleum. For example, U.S. Pat. No. 3,372,749 (1966) discloses the use of a polysaccharide to increase the viscosity of injected water to improve the displacement efficiency of water flooding type oil recovery processes. Polysaccharides such as are produced by microbial action on natural carbohydrates are shown in the prior art for this purpose.

SUMMARY OF THE INVENTION

This invention is a method for recovering petroleum from a subterranean petroleum-containing formation wherein there is at least one injection well penetrating and in communication with the formation and at least one production well penetrating and in communication with the formation by injection of an aqueous fluid through the formation from the injection well to the production well and producing petroleum and aqueous fluids through the production well and wherein the said injected aqueous fluid comprises a polysaccharide in sufficient concentration to increase the viscosity of the aqueous fluid, a water soluble guanidine compound and a naturally occurring salt.

DESCRIPTION OF THE PREFERRED EMBODIMENTS

The invention concerns a method for recovering petroleum from subterranean petroleum-containing formations employing a three component oil recovery fluid. Particularly beneficial results are achieved in cases where the method is used to recover petroleum from a partially depleted or clay-containing formation.

It has now been found that those clay-containing formations can be effectively treated to improve their water permeability or to restore water permeability by the method of the present invention. Simultaneously, the displacement of petroleum from the formation is improved by the increase in viscosity of the displacement fluid with improved mobility ratio and hence displacement efficiency and a reduction in the tendency of the fluid to channel.

As a method for stimulating petroleum production by clay restructuring and stabilization, beneficial effects are achieved by pumping the aqueous fluid into the formation then allowing the formation to remain quiescent for 12–48 hours before said aqueous fluid, water or steam injection is resumed for the production of petroleum. Additional stimulation may be achieved by saturating the aqueous fluid with carbon dioxide, natural gas or nitrogen at a pressure of from 300 to 10,000 psig.

A significant increase in viscosity has been discovered when a guanidine salt and a naturally occurring salt is added to a fully hydrated polysaccharide solution. The reason for the viscosity increase is not entirely understood. It is known that guanidine salts can be used as thickening agents. The thickening properties of guanidine salts, however, do not fully explain the viscous properties of the present invention. The increased viscosity of the present invention is thought to be due to the ionic effect of the guanidine salt and natural salt on the polysaccharide molecule causing increased rigidity in the molecule's backbone. Hydrogen bonding between rigid molecular backbones is thought to increase intermolecular ordering bringing about an increase in viscosity.

Polysaccharides employed in the aqueous fluid utilized in this invention include the scleroglucan group of homopolysaccharides, xanthan gum heteropolysaccharides, or combinations of the two. Scleroglucan, also known as poly(glucosylglucan) is produced by submerged aerobic fermentation of D-glucose by a selected species of the Sclerotium fungus. The nonionic polymer has a molecular weight which ranges from 500,000 to over 6,000,000 and consists of a linear chain of anhydroglucose units linked beta one to three. Thirty to thirty-five percent of the linear chain units bear single appended anhydroglucose units linked beta one to six. A satisfactory scleroglucan for the practice of this invention is Actigum CS-11 ® (formerly known as Polytran ®) from Ceca, S. A. in Paris, France.

Xanthan gum heteropolysaccharides suitable for use in this invention are produced by the fermentation of carbohydrates by the Xanthomonas campestris microorganism. The anionic polymer has a molecular weight which ranges from 1,000,000 to over 6,000,000 and consists of repeating units of D-glucose, D-mannose, and D-glucuronic acid. Glucose linkages like those of cellulose make up the polymer backbone. Mannose and glucuronic acid units are in the side chains and some mannose units are modified with acetyl or pyruvic ketal groups. A satisfactory xanthan gum for the practice of this invention is Rhodopol 23-R ® from RhonePoulenc in Monmouth Junction, N.J. 08852. Concentrations of these polysaccharides of from 0.01 to 0.4% by weight in the aqueous fluid are useful in the present invention. Although concentrations in the range between about 0.025 and about 0.25% by weight are preferred. The exact concentration required for satisfactory oil recovery will depend in part on the characteristics of the reservoir in which the water flooding operation is to be carried out and upon the properties of the oil present therein. In general, it is preferred that sufficient polymer, guanidine salt and naturally occurring salt be employed in the flood water to give the water a viscosity of at least 2 centipoise under reservoir temperature conditions. Concentrations sufficient to give viscosities of up to about 50 centipoise or higher also may advantageously be used, if desired. Fluid composition will be set by the economically optimum combination of constituents, to make the required viscosity.

Guanidine is very soluble in water, and any of the water soluble salts of guanidine can be used in the present invention. For example, guanidine hydrochloride, guanidine acetate and guanidine sulfate are very soluble in water. In addition, guanidine carbonate, guanidine thiocyanate and guanidine nitrate are sufficiently soluble in water to permit their use in the present invention. Guanidine acetate is a particularly desirable guanidine compound.

The concentration of guanidine salt that can be used in the recovery fluid depends upon the solubility of the individual guanidine salt. Included within the scope of this invention are guanidine salt concentrations of from about 0.5% to about 25% by weight depending on the salt solubility in water, but with most satisfactory results in a concentration between about 5% and 25% by weight. For example, guanidine hydrochloride is freely soluble in water, however, concentrations above about 25% to 30% by weight are impractical from a cost basis. In another example, guanidine nitrate is much less soluble in water with 10 parts water needed to dissolve one part guanidine nitrate. Guanidine nitrate concentration in a fluid is therefore limited to less than 10% by weight because of limited solubility.

The naturally occurring salts of this invention are commonly found in ground water supplies, although chemically refined salts can also be added to water along with the guanidine salt and the polysaccharide in preparing the aqueous injection fluid. Naturally occurring salts envisioned in the invention include but are not limited to KCl, NaCl, $Na_2SO_4$, $Na_2CO_3$, $NaHCO_3$, $CaCl_2$, $CaSO_4$, $CaCO_3$, $Ca(HCO_3)_2$, $MgCl_2$, $MgSO_4$, $MgCO_3$, $Mg(HCO_3)_2$, $BaCl_2$ and $SrCl_2$.

Salt concentrations of from about 0.1% to about 25% by weight are envisioned in this invention. Compatibility testing of the polysaccharide with specific salts available for use is necessary, however, since commercially available polysaccharides, particularly xanthan gums, vary in their tolerances to salts. Certain multivalent metal ions such as boron, aluminum, chromium, cobalt, copper, nickel, zinc and ferric ions can precipitate xanthan gum polysaccharides when present in significant quantities, i.e., greater than 200 ppm. Salts of these cations are not suitable additives for the xanthan gum polysaccharide-guanidine salt system suggested, but may be used with the scleroglucan polysaccharide-guanidine salt system.

Compatibility testing is always performed on polysaccharide that has been fully hydrated with fresh water. Salts, including the salts of this invention, hinder the hydration of polysaccharides, preventing them from swelling fully and imparting maximum viscosity enhancement to the fluid. The polysaccharides of this invention must first be fully hydrated with fresh water before mixing with the other constituent chemical species. Fresh water refers to a water which contains less than 0.10% by weight salts with not more than one-sixth by weight of multivalent cations. Except in trace quantities of less than 10 ppm, the following cations are excluded from fresh water: $Al^{+3}$, $B^{+3}$, $Co^{+2}$, $Cr^{+2}$, $Fe^{+3}$, $Ni^{+2}$ and $Zn^{+2}$.

The polysaccharides described for use in this invention can be obtained as powders or as fully hydrated aqueous solutions known as broths. The broth is especially convenient in areas where fresh water is unavailable for prehydrating a powdered product. Commercailly available broths contain from 0.1% to 15% by weight active polysaccharide and a bactericide to prevent biodegradation of the polymer.

The powdered polysaccharide is a soft, bulky powder which contains from about 30–90% by weight of active polysaccharide. The powder must be fully hydrated with fresh water prior to mixing with guanidine and naturally occurring salts. Initial preparation of a 0.5–1.0% by weight active polysaccharide solution in fresh water is necessary to obtain a fully hydrated polymer solution from the powdered product. High speed mechanical mixing or high pressure shearing imparts maximum viscosity to the solutions. Fresh water polymer concentrates should be allowed to stand for up to 24 hours for complete hydration.

The hydrated polymer is readily soluble in larger amounts of fresh or salty water. Complete dissolution of hydrated polymer is achieved by using either a high pressure shear unit equipped with a 1000 psi pump and three shear plates each having a 0.1–0.125 mm orifice, or a high speed mechanical mixer. Unless polymer solution can be completely utilized within 48 hours, incorporation of a biocide into the polymer concentrate and diluted solutions is necessary. Biocides envisioned for use in this invention include but are not limited to formaldehyde and derivatives of r isothiazolins contained in products such as Kathon WT®, manufactured by Rohm and Haas Co., Philadelphia, Pa. 19105. Polymer solutions require 0.75–5 ppm active Kathon WT® or 200–4000 ppm active formaldehyde for protection from bacterial decomposition.

After initial preparation, polysaccharide solutions should be handled under oxygen free conditions. An oxygen scavenger is necessary if water used for polymer solutions contains more than 500 parts per billion dissolved oxygen. Oxygen scavengers envisioned for use in this invention include but are not limited to sodium hydrosulfite and sodium bisulfite. The quantity of oxygen scavenger required to prevent oxidative degradation and loss of polymer viscosity is 3–20 ppm active oxygen scavenger for every one part per million of dissolved oxygen.

Once hydrated, 0.5% to 5% by weight of the naturally occurring salt is initially added to the polymer. The amount of salt added is then increased to obtain a specific polymer-salt compatibility range. Once compatibility with salt and solubility of guanidine salt is determined, full field scale batches of the recovery fluid can be made-up. As mentioned the fluid will typically be made-up to a viscosity in the 2 to 50 centipoise range.

Particularly good petroleum recovery effects are achieved in some petroleum containing formations by saturating the recovery fluid with carbon dioxide, natural gas or nitrogen at a pressure of from about 300 to about 10,000 psig.

As previously pointed out the required fluid viscosity will be determined by formation and petroleum properties according to procedures known in the art. Final fluid composition will be determined by the economically optimum combination of constituents to make the required viscosity while meeting the guanidine salt-natural salt requirements to restructure the clay.

The invention is more fully illustrated by the following examples.

EXAMPLE I

A quantity of a scleroglucan polysaccharide, Polytran® manufactured by Pillsbury Co., was hydrated and then diluted with distilled water to a concentration of 250 ppm. Six samples were then taken and each mixed with different amounts of guanidine acetate or guanidine acetate and sodium chloride. Two control solutions were also made up with the same distilled water, but without the polysaccharide. The viscosities of the eight solutions were determined by Ubbelohde viscometer and the results are reported in Table I.

TABLE I

| Solution Description | Guanidine Acetate, wt % | NaCl, wt % | Viscosity, cp |
|---|---|---|---|
| Distilled water, guanidine acetate | 25% | None | 1.59 |
| Distilled water, guanidine acetate, NaCl | 25% | 25% | 2.34 |
| Distilled water, 250 ppm. Polytran ® | None | None | 1.77 |

TABLE I-continued

| Solution Description | Guanidine Acetate, wt % | NaCl, wt % | Viscosity, cp |
|---|---|---|---|
| Distilled water, 250 ppm. Polytran ®, guanidine acetate | 1.25% | None | 1.83 |
| Distilled water, 250 ppm. Polytran ® guanidine acetate | 2.50% | None | 1.89 |
| Distilled water, 250 ppm. Polytran ® guanidine acetate | 5.00% | None | 1.98 |
| Distilled water, 250 ppm. Polytran ® guanidine acetate | 25% | None | 3.14 |
| Distilled water, 250 ppm. Polytran ® guanidine acetate, NaCl | 25% | 25% | 4.19 |

EXAMPLE II

In a field in which the formation is characterized by core sampling as clay-containing water-sensitive consolidated Berea sandstone, primary production is severely restricted by water sensitive clay swelling. An injection well is completed in the hydrocarbon-bearing formation and perforations are formed between the interval of 5130–5145 ft. A production well is drilled approximately 415 feet distance from the injection well, and perforations are similarly made in the same hydrocarbon-bearing formation at 5135–5150 feet.

There is no fresh water available at the drilling site so Rhodopol 23-R ® powder is hydrated off site in lake water having 675 ppm total dissolved solids including 35 ppm calcium and 65 ppm magnesium and trucked to the field make up tank as a 1.0% concentrate containing 20.0 ppm active Kathan WT ® biocide. Compatibility testing shows no precipitation of polymer in the presence of site ground water which contains 75,000 ppm total dissolved solids including 7,500 ppm of calcium and magnesium. Since dissolved oxygen in the ground water is 3–5 ppm, sodium hydrosulfite is added prior to polymer dilution to give a total of 100 ppm oxygen scavenger in the brine.

Subsequent to oxygen scavenger addition, ground water holding tanks as well as polymer dilution and storage tanks are nitrogen blanketed to provide oxygen free conditions throughout the polymer dilution and injection operation. Hydrated Rhodopol 23-R ® is diluted to 500 ppm using ground water to which 2.5 wt % guanidine acetate is added to produce a solution having 21 cp viscosity. Seventeen thousand barrels of the solution is pumped into the injection well at a rate of 275 barrels per day and a pressure of 900 psi. Ground water is then injected at a rate of 300 barrels per day and a pressure of 725 psi. Petroleum and aqueous fluids are recovered at the production well.

We claim:

1. A method for recovering petroleum from a subterranean petroleum-containing formation wherein there is at least one injection well penetrating and in communication with the formation and at least one production well penetrating and in communication with the formation by injection of an aqueous fluid through the formation from the injection well to the production well and producing petroleum and aqueous fluids through the production well and wherein the said injected aqueous fluid comprises a hydrated polysaccharide in sufficient concentration to increase the viscosity of the aqueous fluid, said polysaccharide being of the scleroglucan group of homopolysaccharides; said hydrated polysaccharide thickened with from about 0.5 wt% to about 25 wt% of a water soluble guanidine compound selected from the group consisting of guanidine hydrochloride, guanidine acetate, guanidine sulfate, guanidine carbonate, guanidine thiocyanate and guanidine nitrate; and about 25 wt% of NaCl.

2. The aqueous fluid comprising a hydrated polysaccharide in sufficient concentration to increase the viscosity of the aqueous fluid, said polysaccharide being of the scleroglucan group of homopolysaccharides, said hydrated polysaccharide thickened with from about 0.5 wt% to about 25 wt% of a water soluble guanidine compound selected from the group consisting of guanidine hydrochloride, guanidine acetate, guanidine sulfate, guanidine carbonate, guanidine thiocyanate and guanidine nitrate, and about 25 wt% of NaCl.

3. A method of stimulating petroleum production in a subterranean petroleum-containing formation wherein there is at least one injection well penetrating and in communication with the formation and at least one production well penetrating and in communication with the formation comprising injecting an agueous fluid, comprising a hydrated polysaccharide in sufficient concentration to increase the viscosity of the aqueous fluid, from about 0.5 wt% to about 25 wt% of a water soluble guanidine compound and about 25 wt% of NaCl into the formation, allowing the formation to remain quiescent for a period of time then injecting said aqueous fluid, water or steam into the injection well and producing petroleum and aqueous fluids through the production well, said polysaccharide being of the scleroglucan group of homopolysaccharides said guanidine compound selected from the group consisting of guanidine hydrochloride, guanidine acetate, guanidine sulfate, guanidine carbonate, guanidine thiocyanate and guanidine nitrate.

4. A method for increasing the viscosity of a hydrated polysaccharide fluid for use in recovering petroleum said polysaccharide being of the scleroglucan group of homopolysaccharides, said method comprising adding from about 0.5 to about 25 percent by weight of a water soluble guanidine compound selected from the group consisting of guanidine hydrochloride, guanidine acetate, guanidine sulfate, guanidine carbonate, guanidine thiocyanate and guanidine nitrate and about 25 percent by weight of NaCl.

* * * * *